Feb. 5, 1952  G. WALTERS ET AL  2,584,825
BRAKE LINING AND METHOD OF MAKING THE SAME
Filed Dec. 11, 1948  3 Sheets-Sheet 1
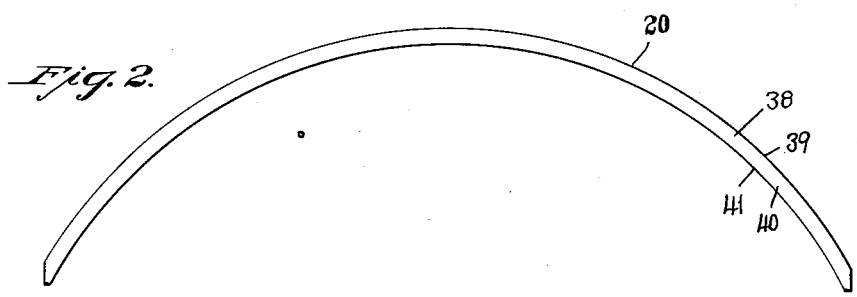
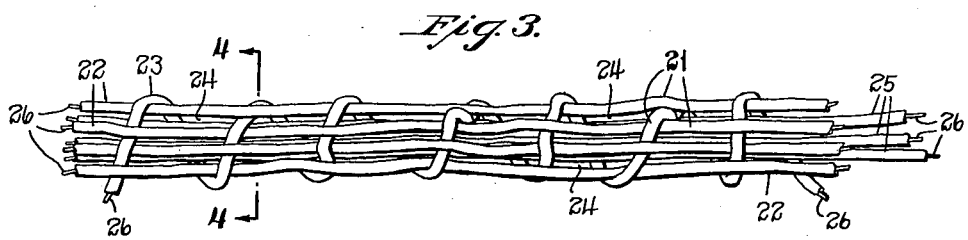
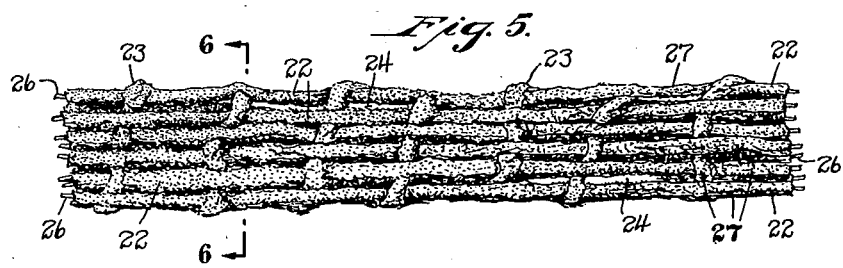
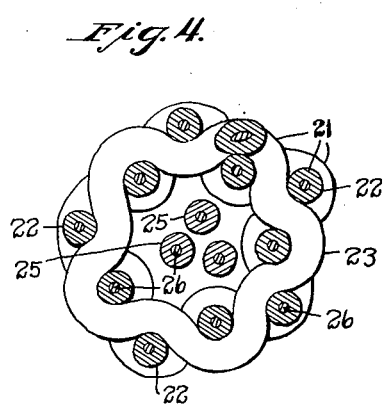
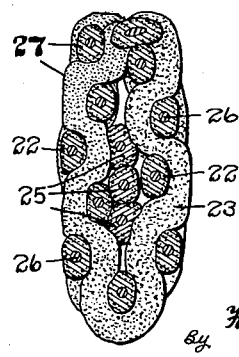
Inventors
Gustav Walters
Henry Clifford Morton
By Seymour Earle & Nichols
Attorneys Feb. 5, 1952      G. WALTERS ET AL      2,584,825
BRAKE LINING AND METHOD OF MAKING THE SAME
Filed Dec. 11, 1948      3 Sheets-Sheet 2
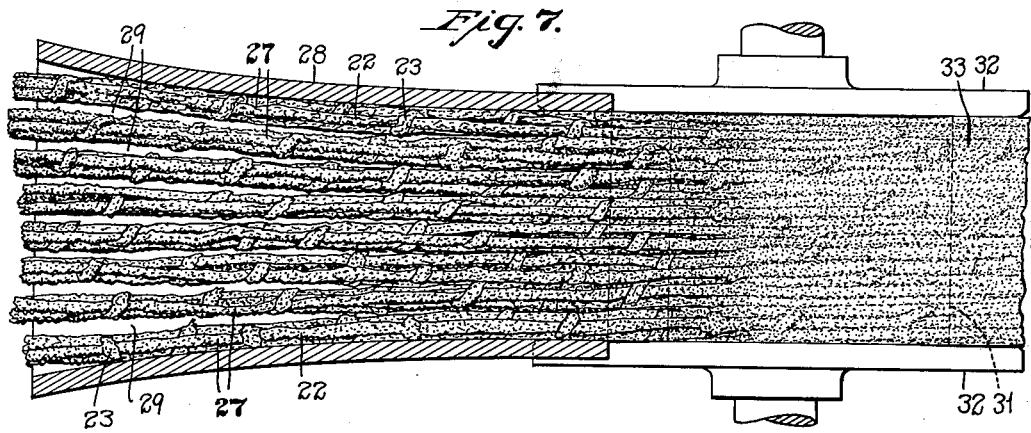
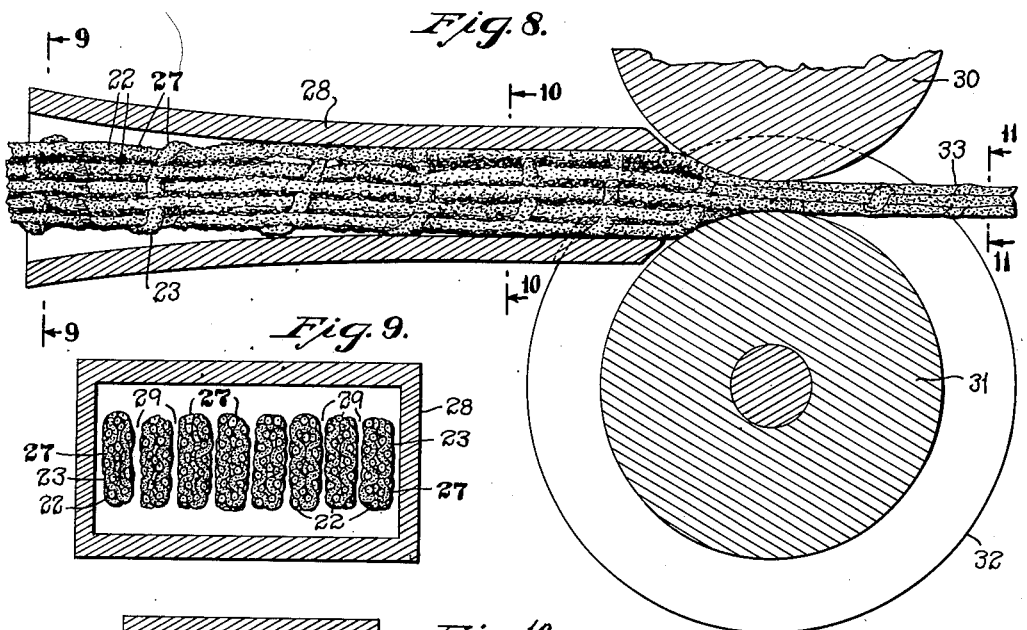
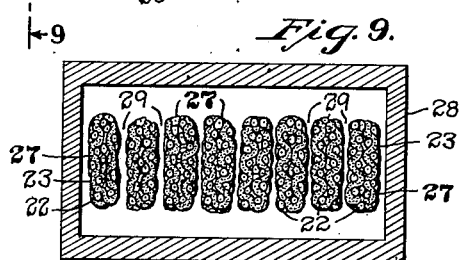
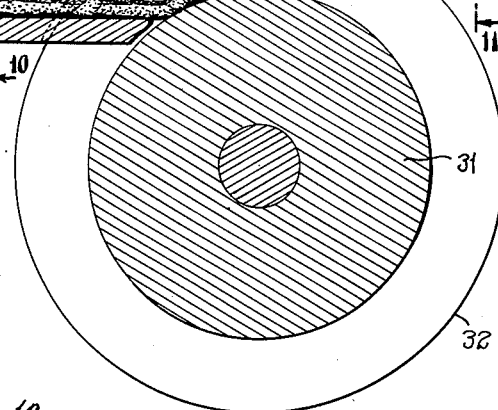
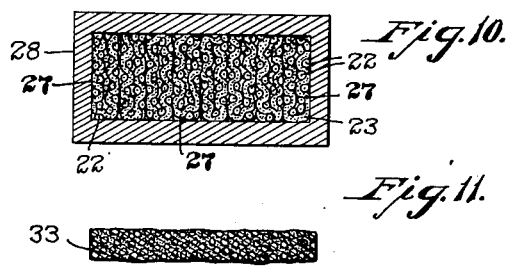
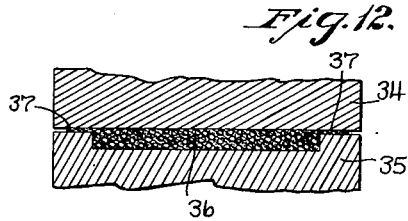
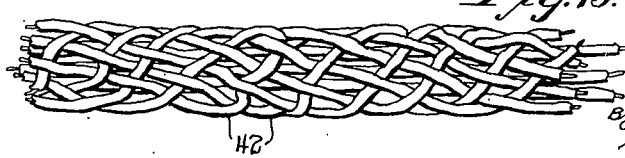

Feb. 5, 1952  G. WALTERS ET AL  2,584,825
BRAKE LINING AND METHOD OF MAKING THE SAME
Filed Dec. 11, 1948  3 Sheets-Sheet 3
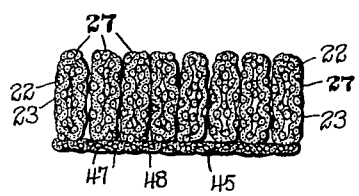
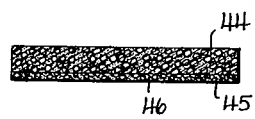
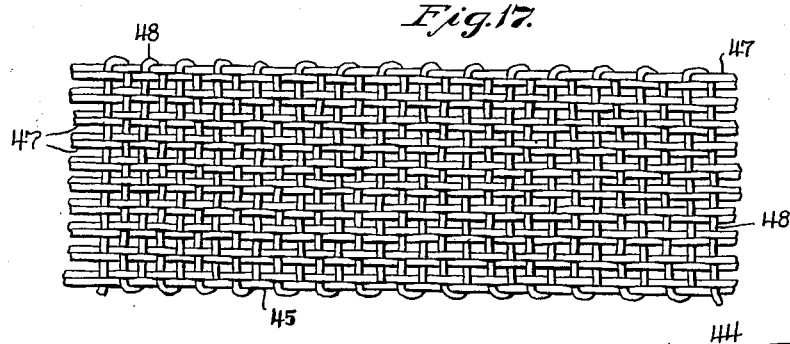
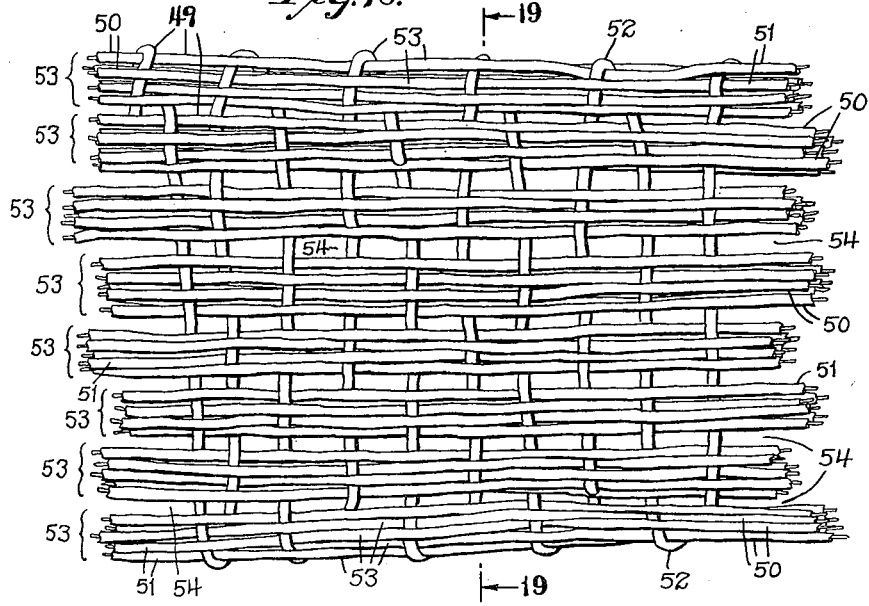
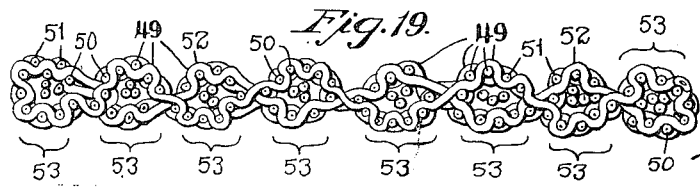
Inventors
Gustav Walters
Henry Clifford Morton
By
Seymour, Earle & Nichols
Attorneys Patented Feb. 5, 1952

2,584,825

UNITED STATES PATENT OFFICE 2,584,825

BRAKE LINING AND METHOD OF MAKING THE SAME

Gustav Walters, Middletown, and Henry Clifford Morton, Branford, Conn., assignors to The Russell Manufacturing Company, Middletown, Conn., a corporation of Connecticut Application December 11, 1948, Serial No. 64,842

6 Claims. (Cl. 154—81)

1

This invention relates to improvements in brake-linings and methods of making the same.

One object of this invention is to provide an improved brake-lining which will have a more uniform friction throughout the life of the lining as it is being worn down in use.

Another object of this invention is to provide an improved brake-lining which will have a longer wear-life.

Another object of this invention is to provide an improved brake-lining which will be more thoroughly impregnated with the friction treatment or material and therefore not absorb as much water during use.

Another object of this invention is to provide an improved brake-lining which will have greater mechanical strength.

Another object of this invention is to provide an improved method of making the herein-described braking-lining.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a top plan view of a brake-lining member made in accordance with the present invention;

Fig. 2 is an edge elevation of Fig. 1;

Fig. 3 is a side elevation of a fragment of a length of a woven member or web used in making brake-lining in accordance with the present invention;

Fig. 4 is an enlarged transverse sectional view on the line 4—4 of Fig. 3;

Fig. 5 is a view similar to Fig. 3, after the web of Fig. 3 has been impregnated with friction material and has been flattened;

Fig. 6 is an enlarged transverse sectional view on the line 6—6 of Fig. 5;

Fig. 7 is a top plan view illustrating a method of forming a plurality of impregnated webs similar to Figs. 5 and 6, arranged in side-by-side relation and upon their edges, into a brake-lining member;

2

Fig. 8 is an edge elevation partly in longitudinal section of Fig. 7;

Fig. 9 is a transverse sectional view on line 9—9 of Fig. 8;

Fig. 10 is a transverse sectional view on line 10—10 of Fig. 8;

Fig. 11 is a transverse sectional view on line 11—11 of Fig. 8;

Fig. 12 is a transverse sectional view illustrating the pressing operation employing heat and pressure;

Fig. 13 is a side elevation similar to Fig. 3 of a modified construction;

Fig. 14 is a view corresponding to Fig. 9, of a modified construction but with the forming-tube omitted;

Fig. 15 is a view corresponding to Fig. 12 but with the dies omitted and the flash removed, of the modified construction illustrated in Figs. 14 to 17;

Fig. 16 is an edge elevation similar to Fig. 2, of the modified form of brake-lining illustrated in Figs. 14 and 15;

Fig. 17 is a top plan view of the reticular woven bottom member shown as forming the bottom portion of the brake-lining of Figs. 14 to 16;

Fig. 18 is a view similar to Fig. 3, of a modified form of webbing for use in making brake-lining; and Fig. 19 is a transverse sectional view on line 19—19 of Fig. 18.

Referring to Figs. 1 to 12 of the drawings showing the particular form of the invention chosen for illustration therein, the brake-lining member or brake-friction or braking-face strip 20 is made from a plurality of webs or web-elements or web-units 21 each of which is made as illustrated in Figs. 3 and 4 by interlacing a plurality of longitudinal or warp strands 22 with a transverse or weft strand 23 by weaving them very loosely. The looseness of the weave together with the few picks of the weft strand 23 makes relatively-large spaces or openings or interstices 24 which greatly facilitate the penetration of the thick liquid impregnating friction material that is used. Preferably, a plurality of non-woven interior or central strands 25 extend freely through the tubular outer or exterior woven portion formed by the interwove strands 22 and 23 in order to increase the bulk of the woven web 21. The weft strand 23 extends in a continuous generally-helical manner and therefore results in the web 21 being of tubular form, although as woven, it is of more flattened form than is illustrated in Fig. 4 which is made of a generally-cylindrical form in order to better illustrate the looseness of the construction. The strands 22, 23 and 25 are preferably formed of asbestos with a small portion of cotton or other strengthening fiber, and preferably have wire cores 26 of brass or other suitable metal. The member or web 21 is next impregnated with suitable friction-binding or bonding-treatment or material, preferably of a type which will give a strong bonding action under heat and pressure, such as, for example, the well-known Bakelite type of friction material, in the form of a thick liquid, and the impregnated web 27, which is of greater height than width, is then dried (Figs. 5, 6).

A suitable number of dried impregnated webs or web-lengths or web-units 27 are now passed in side-by-side contact relation with one another through a tapered forming-tube 28 (Figs. 7 and 8) of generally rectangular internal cross-sectional form, which presses the webs 27 sidewise together and closes up the spaces 29 between the web-members 27, and slightly compresses the members 27 down edgewise (Fig. 8), whereupon the pressed-together web-members 27 (Figs. 10, 7, 8) pass between a pair of rolls 30 and 31, the roll 31 of which has a pair of flanges 32 spaced apart the same distance as the width of the pressed-together webs 27 as they leave the forming-tube 28. The rolls 30 and 31 press the webs 27 down edgewise to a relatively-dense coherent mass forming a strip 33 of the general form illustrated in Fig. 11, the compressed coherent strip 33 is then cut into suitable lengths, each of which is subjected to heat and pressure between die-members 34 and 35 (Fig. 12) to densify and semi-cure the member 33 into a unitary dense member 36 having flash-portions 37, which flash-portions are subsequently trimmed off, whereupon the trimmed members 36 are heated and bent to their final curved form, such as illustrated in Fig. 2, whereupon they are given the necessary additional heat treatment to completely cure them to final condition, after which they are ground to finished form, as illustrated in Figs. 1 and 2. If the brake-lining is to be secured to a brake shoe by cementing, rivet holes are not needed, otherwise, the lining would be provided with the usual rivet holes. The braking-face portion 38 of the lining provides a braking-face 39 throughout the wear-life of the lining, and the back-face portion 40 provides the back-face 41 which of course is not subject to any wear.

Instead of employing a web-member 21 having the strands interlaced by weaving, the interlacing of the strands can be accomplished otherwise such, for example, as by braiding the strands 22 to form a web 42, as illustrated in Fig. 13, which can be impregnated and flattened and have a plurality of the impregnated braided webs 42 formed into a friction-member in similar fashion to that hereinbefore described.

Instead of having the impregnated woven web-members 27 form the entire brake-lining strip or member, a brake-lining member 43 (Fig. 16) can be formed by employing the impregnated web-members 27 for forming the braking-face portion or strip or member 44 of the brake-lining member 43, and by employing a reticular backing-member 45 (Figs. 14 to 17) to form the back-face portion 46. The member 45 may be woven (Fig. 17) by weaving longitudinal or warp strands 47 with a transverse or weft strand 48. The strands 47 and 48 can be of wire-cored asbestos or of bare wire, or of other suitable material, or the member 45 can be any reticular member having sufficient mechanical strength to prevent possible splitting of the lining-member by the rivets commonly employed to secure the lining-member on a brake-shoe. Fig. 14 corresponds to Fig. 9 of the previously-described form of the invention with the forming-tube omitted and with the addition of the reticular backing-member 45 at the back thereof; Fig. 15 corresponds to the similar member illustrated in Fig. 12, but with the dies omitted and the flash removed; and Fig. 16 illustrates a side edge view similar to Fig. 2, of the brake-lining member 43 having the reticular reinforcing-member 45 forming the back-face portion 46 thereof. Where a back-face member 45 is employed, it will be made of a thickness in the final brake-lining which will never be reached during the wear-life of the brake-lining, so that all the braking action throughout the wear-life of the brake-lining will take place against a portion of the impregnated web or webs of interlaced strands, which impregnated webs will ordinarily occupy more than half the thickness of the finished brake-lining.

Instead of making a single web such as the web 21 of Fig. 3, a web or multi-web 49 such as illustrated in Fig. 18, can be made which has a plurality of groups 50 of longitudinal or warp strands 51 woven with a single weft strand 52. Each group 50 of warps with its interwoven weft portion of the weft 52 may be referred to as a web-element or web-unit 53. The web-elements 53 are only web-connected to one another by the interconnecting portions of the weft 52, and are shown somewhat spaced apart from one another as at 54 in order to optically distinguish the web-elements, but actually as woven they will ordinarily be so close together as to not be readily distinguishable by the eye. Instead of employing a plurality of separate webs 21 of Fig. 3, a single multi-web 49 containing the plurality of web-elements 53, either with or without a bottom reticular member 45, can be used to produce a brake-lining member similar to one or the other of those hereinbefore shown and described.

The strands used for forming the web or webs of interlaced strands may be of wire covered with asbestos or other suitable material, or they may be bare.

Brake-lining made in accordance with this invention gives more uniform impregnation due to the loose construction of the web, and therefore a more uniform degree of friction throughout the wear-life of the lining gives longer life, absorbs less water due to the thorough impregnation and thus also contributes to more uniform friction under varying driving conditions, and gives greater mechanical strength due to the interlocking action between the interstices or openings such as 24 in Fig. 3, between the strands in the side portions of pressed-together adjacent web-lengths, and projections formed by corresponding strand portions of the side portions of pressed-together adjacent web-lengths.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A brake friction member having a arcuate braking-face strip comprising: a plurality of heat-hardenable, bonding-friction-material-impregnated web-units, each initially of greater height than width, and said impregnated web-units extending in side-by-side relation with one another widthwise of said impregnated web-units and of said strip and substantially throughout the length of said strip as edgewise-compressed impregnated web-units forming a heat-hardened unitary mass forming said strip; and each web-unit initially having strands loosely interlaced together substantially throughout the height and length of the web-unit.

2. A brake friction member having an arcuate braking-face strip comprising: a plurality of heat-hardenable, bonding-friction-material-impregnated web-units, each initially of greater height than width, and said impregnated web-units extending in side-by-side relation with one another widthwise of said impregnated web-units and of said strip and substantially throughout the length of said strip as edgewise-compressed impregnated web-units forming a heat-hardened unitary mass forming said strip; and each web-unit initially having strands loosely interlaced together substantially throughout the height and length of the web-unit, and each web-unit being free of web-connection with any other web-unit.

3. A brake friction member having an arcuate braking-face strip comprising: a plurality of heat-hardenable, bonding-friction-material-impregnated web-units, each initially of greater height than width, and said impregnated web-units extending in side-by-side relation with one another widthwise of said impregnated web-units and of said strip and substantially throughout the length of said strip as edgewise-compressed impregnated web-units forming a heat-hardened unitary mass forming said strip; and each web-unit as woven having longitudinal and transverse strands loosely interwoven together substantially throughout the height and length of the web-unit, and each web-unit being free of web-connection with any other web-unit.

4. A brake friction member having an arcuate braking-face strip comprising: a plurality of heat-hardenable, bonding-friction-material-impregnated web-units, each initially of greater height than width, and said impregnated web-units extending in side-by-side relation with one another widthwise of said impregnated web-units and of said strip and substantially throughout the length of said strip as edgewise-compressed impregnated web-units forming a heat-hardened unitary mass forming said strip; and each web-unit as woven having two side-wall portions, and each side-wall portion having longitudinal and transverse strands loosely interwoven together substantially throughout the height and length of the web-unit, and each web-unit being free of web-connection with any other web-unit.

5. The method of making a brake friction member having an arcuate braking-face strip, comprising: providing a web having strands loosely interlaced together substantially throughout its height and length; impregnating said web with heat-hardenable bonding friction material and forming said impregnated web of greater height than width; arranging web-units of said impregnated web in side-by-side relation with one another widthwise of said impregnated web-units and of said strip and substantially throughout the length of said strip; and subjecting said arranged impregnated web-units to heat and edgewise pressure and forming a braking-face strip.

6. The method of making a brake friction member having an arcuate braking-face strip, comprising; providing a web having strands loosely interlaced together substantially throughout its height and length; impregnating said web with heat-hardenable bonding friction material and forming said impregnated web of greater height than width; arranging web-units of said impregnated web in side-by-side relation with one another widthwise of said impregnated web-units and of said strip and substantially throughout the length of said strip, each web-unit being free of web-connection with any other web-unit; and subjecting said arranged impregnated web-units to heat and edgewise pressure and forming a braking-face strip.

GUSTAV WALTERS.
HENRY CLIFFORD MORTON.

REFERENCES CITED

The following references are of record in the file of this patent:

UNITED STATES PATENTS

| Number | Name | Date |
| --- | --- | --- |
| 2,025,039 | Cannon | Dec. 24, 1935 |
| 2,096,692 | Cilley | Oct. 19, 1937 |
| 2,196,569 | Strochla et al. | Apr. 9, 1940 |
| 2,240,358 | Walters | Apr. 29, 1941 |